US009602574B1

(12) United States Patent
Mocanu et al.

(10) Patent No.: US 9,602,574 B1
(45) Date of Patent: Mar. 21, 2017

(54) PRERENDERING TIME ZONE AWARE LAYOUTS FOR RICH WEB APPS

(71) Applicant: GOOGLE INC., Mountain View, CA (US)

(72) Inventors: Sorin Alexandru Mocanu, Zurich (CH); Patrick Mowat Coleman, Zurich (CH)

(73) Assignee: GOOGLE INC., Mountain View, CA (US)

( * ) Notice: Subject to any disclaimer, the term of this patent is extended or adjusted under 35 U.S.C. 154(b) by 319 days.

(21) Appl. No.: 14/191,091

(22) Filed: Feb. 26, 2014

(51) Int. Cl.
H04L 29/08 (2006.01)

(52) U.S. Cl.
CPC .................................... *H04L 67/02* (2013.01)

(58) Field of Classification Search
None
See application file for complete search history.

(56) References Cited

U.S. PATENT DOCUMENTS

| 7,916,580 | B2 | 3/2011 | Nalla et al. | |
|---|---|---|---|---|
| 7,948,832 | B1* | 5/2011 | Luo | G06Q 10/109 368/21 |
| 8,400,881 | B2 | 3/2013 | Nalla et al. | |
| 8,655,714 | B2 | 2/2014 | Weir et al. | |
| 2003/0005056 | A1* | 1/2003 | Yamamoto | G06Q 10/109 709/205 |
| 2003/0115258 | A1* | 6/2003 | Baumeister | H04L 29/06 709/203 |
| 2003/0212594 | A1* | 11/2003 | Hogan | G06F 17/30867 705/14.49 |
| 2007/0150502 | A1* | 6/2007 | Bloebaum | G06F 17/30861 |
| 2008/0051108 | A1 | 2/2008 | Stewart | |
| 2009/0164293 | A1* | 6/2009 | Coley | G06Q 10/06311 705/7.13 |
| 2010/0075648 | A1 | 3/2010 | Matsuoka et al. | |
| 2011/0163873 | A1 | 7/2011 | McIntosh | |
| 2011/0238736 | A1* | 9/2011 | Tanaka | G06F 9/5011 709/203 |
| 2011/0250902 | A1 | 10/2011 | Huang et al. | |

(Continued)

OTHER PUBLICATIONS

"Web Development: What Are The Trade-Offs of Client Side Rendering Vs. Server-Side Rendering", Forbes, Jul. 10, 2013, http://www.forbes.com/sites/quora/2013/07/10/web-development-what-are-the-trade-off-of-client-side-rendering-vs-server-side-rendering/ [retrieved Feb. 24, 2014].

*Primary Examiner* — Scott B Christensen
*Assistant Examiner* — Sean Concannon
(74) *Attorney, Agent, or Firm* — Birch, Stewart, Kolasch & Birch, LLP

(57) ABSTRACT

Provided are methods and systems for rendering and displaying an initial layout of a web application (e.g., calendar application), where the layout includes data specific to a time zone determined to be applicable to a user. Server-side rendering of the initial layout is utilized without compromising the correctness of the initial layout if the server-side heuristics fail. The methods and systems are designed such that it is not necessary to "know," "fingerprint," or "reverse engineer" the browser's local time zone in order to validate the time data to be displayed with the user's time-bound information (e.g., calendar data) in the web application. Furthermore, meaningful time data can be displayed to the user without the full web application having to execute in the browser.

20 Claims, 10 Drawing Sheets

(56) References Cited

U.S. PATENT DOCUMENTS

2012/0225664 A1* 9/2012 Baudino ............... G04R 20/18
455/456.1
2013/0325977 A1* 12/2013 Drews .................... G06F 17/30
709/206

* cited by examiner

PRERENDERING TIME ZONE AWARE LAYOUTS FOR RICH WEB APPS

BACKGROUND

The load times of a rich web application's initial page suffer as a client needs to render the layout in a browser. An existing work-around to this problem is rendering the layout (e.g., HTML version) of the first page of the application on a server and then allowing the application to initialize while the user sees a usable view that is somewhat similar to what the user will see in the initialized application. However, the rendering server does not know the time zone applicable in the user's browser, and therefore is unable to render any time information for display to the user in the initial page of the web application.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to web applications. More specifically, aspects of the present disclosure relate to methods and systems for rendering and displaying time zone specific data to a user in a web application.

One embodiment of the present disclosure relates to a computer-implemented method comprising: receiving, at a server, a request for a web application from a client, wherein the web application displays time-bound information; estimating a time zone applicable to the client based on weighted data associated with a user of the client; rendering initial layout data for the web application based on the estimated time zone; sending the rendered layout data to the client; determining that the estimated time zone matches an actual time zone applicable to the client; and using the rendered layout data to display an initial view of the web application to the user, wherein the initial view of the web application includes time zone-dependent data specific to the user.

In another embodiment, the method further comprises: determining a time period covered by time-bound information of the user included in the rendered layout; identifying time zone offset changes applicable to the time period covered by the time-bound information in the estimated time zone; and sending information about the identified time zone offsets with the rendered layout data to the client.

In another embodiment, the method further comprises: in response to receiving the request for the web application, determining that additional data is needed to estimate a time zone applicable to the client; and sending to the client rendered layout data containing a limited view of the web application.

In yet another embodiment, the method further comprises: receiving at the server an additional request for the web application from the client, wherein the additional request includes an indication of a time zone applicable to the user; rendering layout data for the web application based on the indicated time zone applicable to the user; and sending the rendered layout data to the client.

In still another embodiment, the method further comprises receiving, at the server, with the request for the web application, data associated with the user, and assigning weights to the received data associated with the user based on a measure of utility of the data in estimating a time zone applicable to the client.

In another embodiment, estimating the time zone applicable to the client includes generating candidate time zones applicable to the client based on the weighted data associated with the user, and selecting a candidate time zone with the highest probability based on the weighted data as the estimated time zone applicable to the client.

Another embodiment of the present disclosure relates to a system comprising one or more processors and a non-transitory computer-readable medium coupled to the one or more processors having instructions stored thereon that, when executed by the one or more processors, cause the one or more processors to perform operations comprising: receiving a request for a web application from a client, wherein the web application displays time-bound information; estimating a time zone applicable to the client based on weighted data associated with a user of the client; rendering initial layout data for the web application based on the estimated time zone; sending the rendered layout data to the client; determining that the estimated time zone matches an actual time zone applicable to the client; and using the rendered layout data to display an initial view of the web application to the user, wherein the initial view of the web application includes time zone-dependent data specific to the user.

In another embodiment, the one or more processors of the system are caused to perform further operations comprising: determining a time period covered by time-bound information of the user included in the rendered layout; identifying time zone offset changes applicable to the time period covered by the time-bound information in the estimated time zone; and sending information about the identified time zone offsets with the rendered layout data to the client.

In yet another embodiment, the one or more processors of the system are caused to perform further operations comprising: in response to receiving the request for the web application, determining that additional data is needed to estimate a time zone applicable to the client; and sending to the client rendered layout data containing a limited view of the web application, wherein the limited view of the web application includes data other than time zone-dependent data specific to the user.

In still another embodiment, the one or more processors of the system are caused to perform further operations comprising: receiving an additional request for the web application from the client, wherein the additional request includes an indication of a time zone applicable to the user; rendering layout data for the web application based on the indicated time zone applicable to the user; and sending the rendered layout data to the client.

In yet another embodiment, the one or more processors of the system are caused to perform further operations comprising: receiving, with the request for the web application, data associated with the user; and assigning weights to the received data associated with the user based on a measure of utility of the data in estimating a time zone applicable to the client.

In still another embodiment, the one or more processors of the system are caused to perform further operations comprising: generating candidate time zones applicable to the client based on the weighted data associated with the user; and selecting a candidate time zone with the highest probability based on the weighted data as the estimated time zone applicable to the client.

Yet another embodiment of the present disclosure relates to one or more non-transitory computer readable media storing computer-executable instructions that, when executed by one or more processors, causes the one or more processors to perform operations comprising: receiving a request for a web application from a client, wherein the web application displays time-bound information; estimating a time zone applicable to the client based on weighted data associated with a user of the client; rendering initial layout data for the web application based on the estimated time zone; sending the rendered layout data to the client; determining that the estimated time zone matches an actual time zone applicable to the client; and using the rendered layout data to display an initial view of the web application to the user, wherein the initial view of the web application includes time zone-dependent data specific to the user.

In one or more other embodiments, the methods and systems described herein may optionally include one or more of the following additional features: the web application is a calendar application, the limited view of the web application includes data other than time zone-dependent data specific to the user; the indication of a time zone applicable to the user is based on scripts executed at the client; the data associated with the user includes an IP address of a device associated with the request for the web application received from the client; the data associated with the user includes one or more cookies containing data indicating a time zone preference for the user; the data associated with the user includes one or more cookies containing data about previous requests for the web application received from the user; and/or the data associated with the user includes data about language and/or locale preferences of the user indicated by HTTP headers of the request received from the client.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
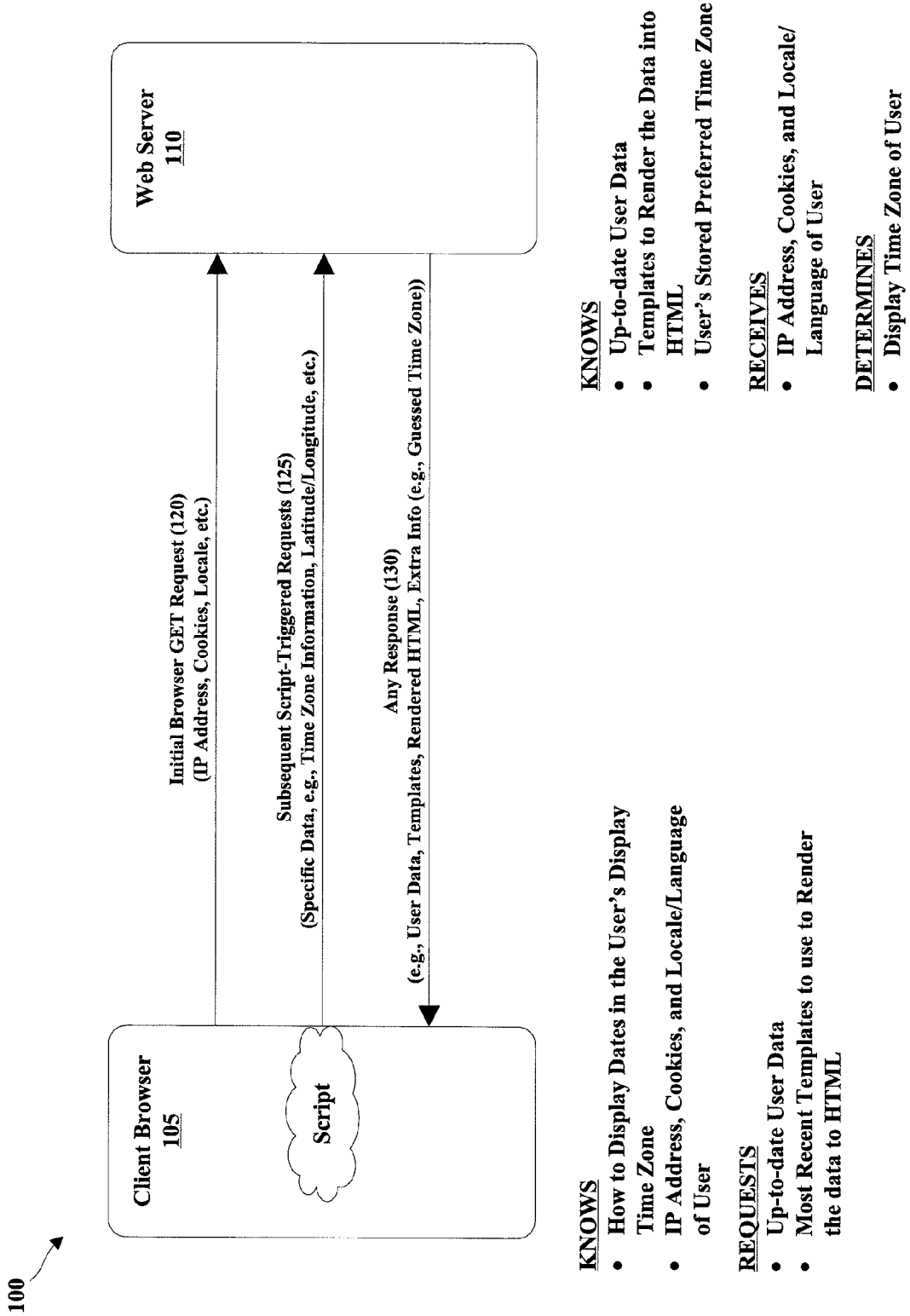
FIG. 1 is a block diagram illustrating an example system and surrounding environment for rendering and displaying time-bound information to a user, including data specific to a time zone applicable to the user according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

Embodiments of the present disclosure relate to methods and systems for providing server-side rendering of an initial layout for a web application (e.g., a web application that displays time-bound information, such as a calendar application) without compromising the correctness of the initial layout if the server-side heuristics fail. As will be described in greater detail herein, the methods and systems of the present disclosure provide web applications with the ability to display accurate time zone-aware data and determine whether such data has been correctly rendered at the time the data hits the client (e.g., user's) browser.

As discussed above, some existing approaches address long load times for a web application's initial page in a client's browser by rendering the layout (e.g., HTML version) of the initial page on a server and then allowing the application to initialize while the user sees an usable view that is somewhat similar to what the user will likely see in the initialized application. However, such existing approaches suffer in that the rendering server does not know the time zone applicable in the user's browser and therefore is unable to render any time information. As will be described in greater detail herein, the methods and systems of the present disclosure ensure that users see reliable localized time zone-aware data faster in a rich web application.

Other existing approaches rely on a user's indicated preference as to the time zone that should be used for data displayed in the web application. As such, the web application does not display data in the browser's current time zone. This means, for example, that any time the user travels (e.g., to a location in a time zone different from the user's preferred time zone) he or she must change/update the time zone to be used in the web application. Otherwise, data (e.g., calendar events, appointments, etc.) will be displayed in the web application at the wrong times.

In accordance with one or more embodiments described herein, the methods and systems of the present disclosure are designed such that it is not necessary to "know," "fingerprint," or "reverse engineer" the browser's local time zone in order to validate the time data to be displayed with the user's time-bound information (e.g., calendar data) in the web application. Furthermore, the methods and systems described herein allow meaningful time data to be displayed to the user without the full web application having to execute in the browser.

As will be described in greater detail below, a time zone applicable to the user (e.g., the user's "client" time zone, such as the time zone applicable in the user's browser) may be estimated at the web server based on various data (e.g., signals) associated with the user. Some examples of signals that may be used to estimate the time zone applicable to the user include a user-indicated preference, a cookie stored for the user, an IP-to-geolocation-to-time zone database lookup based on the render request user IP address, accepted or preferred languages/locales (e.g., based on locale identifiers, which may include a language identifier, geographic region identifier, etc.) as hinted by HTTP headers of the render request, and the like. Based on one or more of these signals, the time zone most likely to apply to the user may be selected and used to render the initial layout of the web application. The represented time frame (e.g., "I am showing March events in Calendar") and the time zone state across this time frame (e.g., "the offset at the beginning of March is UTC+1, at the end of March it is UTC+2 and there is a transition at 31 Mar. 2013, 02:00") may be recorded and sent to the client browser as a payload together with the rendered layout.

Depending on the implementation, the client browser may be configured to delay displaying the time zone-aware data until the browser can also evaluate the time zone payload. In such a scenario, a minimal piece of code that runs in the browser may validate that the time zone transitions are the known ones.

FIG. 1 illustrates an example system for rendering and displaying a web application (e.g., a calendar application) to a user where the application includes data specific to a time zone applicable to the user. In accordance with one or more embodiments, the system 100 may include a client browser 105 and a web server 110 (e.g., a web server hosting the application).

In accordance with at least one embodiment, where the web application requested by a user is a calendar application, the client browser 105 may be aware of how to display relevant dates (e.g., for calendar events of the user) in the time zone from which the user is requesting the dates be displayed in the browser. The client browser 105 may also know, for example, the IP address of a device being utilized by the user in operating the client browser 105, one or more cookies containing data about the user's preferences with respect to the requested web application and/or containing data about the user's previous visits to the website associated with the requested web application, accepted languages/locales associated with the user, and the like. The web server 110 may be aware of (or have access to) updated (e.g., up-to-date) user data with respect to the web application (e.g., updated data about calendar events of the user), one or more templates that may be used to render time-bound (e.g., calendar-related) data into HTML, and/or the user's stored preferences with respect to time zone. As will be described in greater detail below, the data and information known by (or accessible to) the client browser 105 and the web server 110 may be used in various requests and exchanges between the two components.

The client browser 105 may be configured to send an initial browser GET request (120) to web server 110. For example, a user may wish access a calendar application by directing client browser 105 to a corresponding website for the application hosted by web server 110. In such an example, client browser 105 may send a HTTP request (120) to web server 110, where the HTTP request (120) may be a request for the web server 110 to render HTML for the browser 105 to use in composing the initial web page requested by the user. The request (120) received at server 110 from client browser 105 may include various data associated with the user including, for example, for example, an IP address of a device associated with the request (120) received from the client browser 105, one or more cookies containing data about the user's preferences and/or previous visits to the website associated with the web application, accepted languages/locales as hinted by HTTP headers of the render request (120) received from the client browser 105, and the like.

In accordance with at least one embodiment described herein, client browser 105 may send one or more subsequent requests (125) (e.g., script-triggered requests) to the web server 110. For example, the client browser 105 may send a second request (125) to the web server 110, where the second request (125) includes specific data obtained for the user by, for example, the client browser 105. For example, the client browser 105 may send a second request (125) to the web server 110 containing specific data about a time zone applicable to the user (e.g., as determined using the browser's 105 JavaScript), geo-location information (e.g., latitude/longitude data), etc.

The web server 110 may be configured to, in response to receiving the initial request (120) and/or a subsequent request (125) from the client browser, send a response (130) to the client browser 105. For example, the server 110 may send to the client browser 105 a response (130) including specific user data (e.g., time zone-dependent data, identified time zone offset changes covering a tracked time period in an estimated time zone for the user, etc.), rendered HTML, one or more templates for use by the browser 105 in filling-in missing components of the HTML rendered by the web server 110, and the like. The various data flows between client browser 105 and web server 110 will be described in greater detail in the sections that follow.

Figure 2:
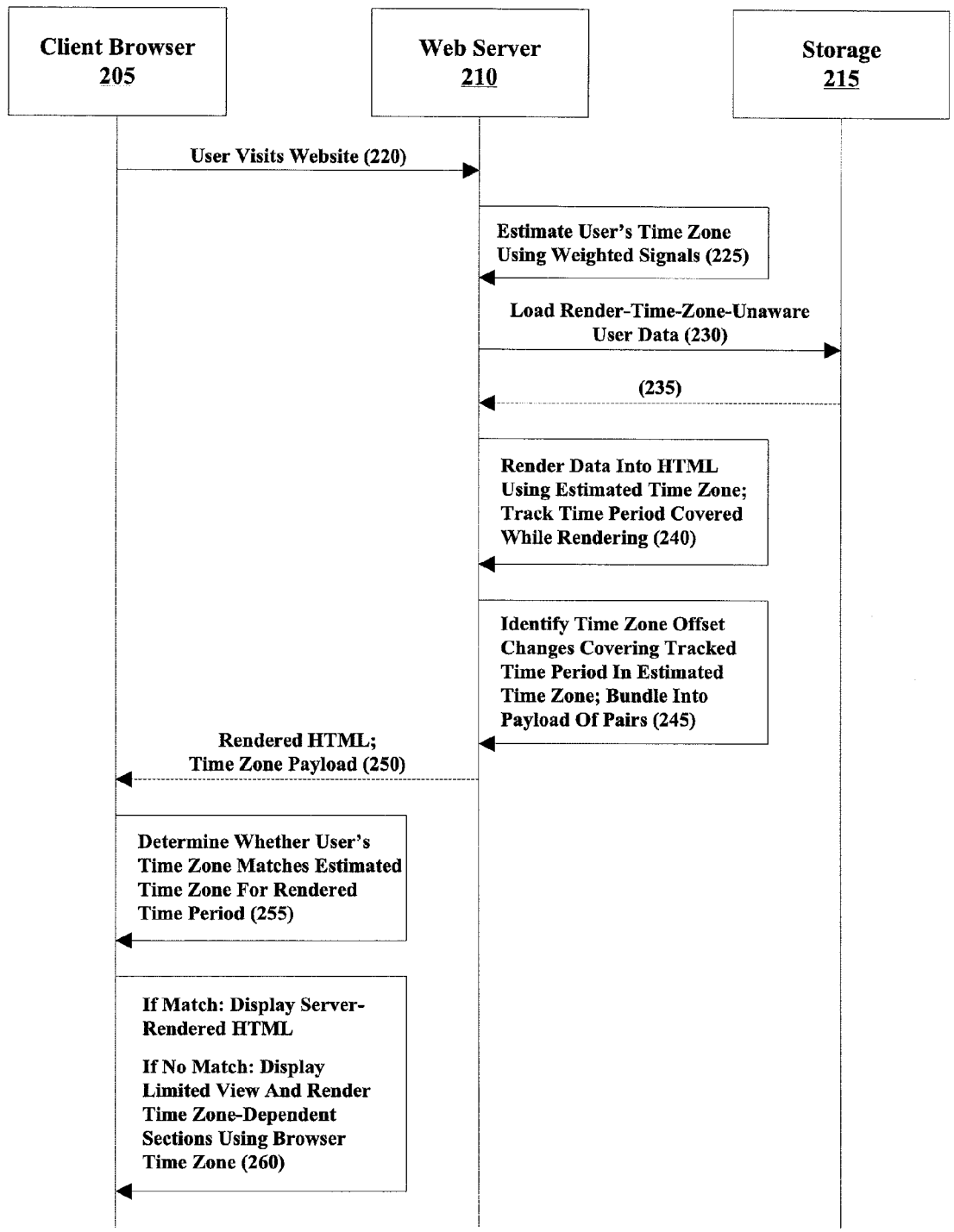
FIG. 2 is a data flow diagram illustrating example data flows between components of a system for rendering and displaying time-bound information to a user, including data specific to a time zone determined as applicable to the user based on weighted signals according to one or more embodiments described herein.

FIG. 2 illustrates example data flows in a system for rendering and displaying time-bound information (e.g., calendar data) to a user. In accordance with one or more embodiments described herein, the data flows may be between a client browser 205, a web server 210, and storage (e.g., database) 215, and may include data specific to a time zone determined as applicable to a user based on one or more weighted signals. In at least one implementation, the example data flows illustrated in FIG. 2 may be between components of a system similar to system 100 described above and illustrated in FIG. 1.

A user may wish access a web application, such as calendar application, by directing a web browser 205 to a corresponding website (220) for the application hosted by a server 210. For example, when client browser 205 is directed to a website for a calendar application, client browser 205 may send a HTTP request (220) (e.g., initial GET request (120) sent from client browser 105 to web server 110 in the example system 100 shown in FIG. 1) to server 210. The request (220) received at server 210 from client browser 205 may include various data associated with the user including, for example, an IP address, one or more cookies containing data about the user's preferences and/or previous visits to the website, accepted languages/locales as hinted by HTTP headers of the render request, and the like.

The server 210, upon receiving the render request (220) from the client browser 205, may estimate a time zone (225) currently applicable to the user based on one or more signals identified/determined by the server 210. For example, the server 210 may estimate a time zone (225) applicable to the user based on the various data received with the render request (220), based on one or more determinations derived by the server 210 from the received render request (220), and/or any combination thereof. In accordance with at least one embodiment, the server 210 may assign weights to the identified signals (e.g., data associated with the user) and use the weighted signals to generate an estimate of the time zone (225) applicable to the user. In at least one example, the server 210 may assign weights to the signals based on how useful each signal is as a predictor of the user's time zone (e.g., a measure of the utility of each signal in estimating a time zone applicable to the user/client).

The web server 210 may send a load request (230) (e.g., may request/retrieve/etc.) for rendered time-zone-unaware user data to storage 215. For example, time-zone-unaware user data may include various time-bound (e.g., calendar) events data such as an event title, even description, list of attendees, etc. In the context of a social post (e.g., a social network post), such time-zone-unaware user data may include, for example, the contents of the post, photo links, comment contents, and the like. In response to the request (230), the web server 210 may receive the time-zone-unaware user data (235) from storage 215. The web server 210 may render (240) the received time-zone-unaware user data (235) into HTML using the estimated time zone for the user. In accordance with at least one embodiment, while the web server 210 renders the time-zone-unaware user data into HTML (240), the web server 210 may also determine (e.g., track) the time period covered by the rendered time-zone-unaware user data (e.g., calendar data of the user) while performing the rendering. For example, the server 210 may have access to an extension database of time zone transitions. As such, the server 210 may calculate the expected time zone offset for each entry (e.g., as illustrated in the example interface screen 700 shown in FIG. 7 and described in greater detail below). In accordance with at least one embodiment, the web server 210 may be configured to determine the time zone transitions that occur between the timestamps of the first entry in the time-zone-unaware user data and the last entry in the time-zone-unaware user data.

The web server 210 may identify time zone offset changes covering the tracked time period in the estimated time zone for the user, and bundle such time zone offset changes into one or more payloads of pairs (245).

The web server 210 may send the rendered HTML and time zone payload (250) to the client browser 205. The client browser 205, upon receiving the rendered HTML and time zone payload (250) from the web server 210, may determine whether the user's actual time zone matches the estimated time zone for the rendered time period (255). In accordance with one or more embodiments described herein, where the client browser 205 determines (255) that the user's time zone matches the estimated time zone for the rendered time period, the client browser may display (260) the rendered HTML received from the web server 210 (the "server-rendered HTML"). On the other hand, where the client browser 205 determines that the user's time zone does not match the estimated time zone for the rendered time period, the client browser 205 may display (260) a limited (e.g., degraded, reduced, etc.) view of (e.g., the initial page of) the web application and render time zone-dependent portions of the displayed view using the time zone applicable to the browser 205.

Figure 3:
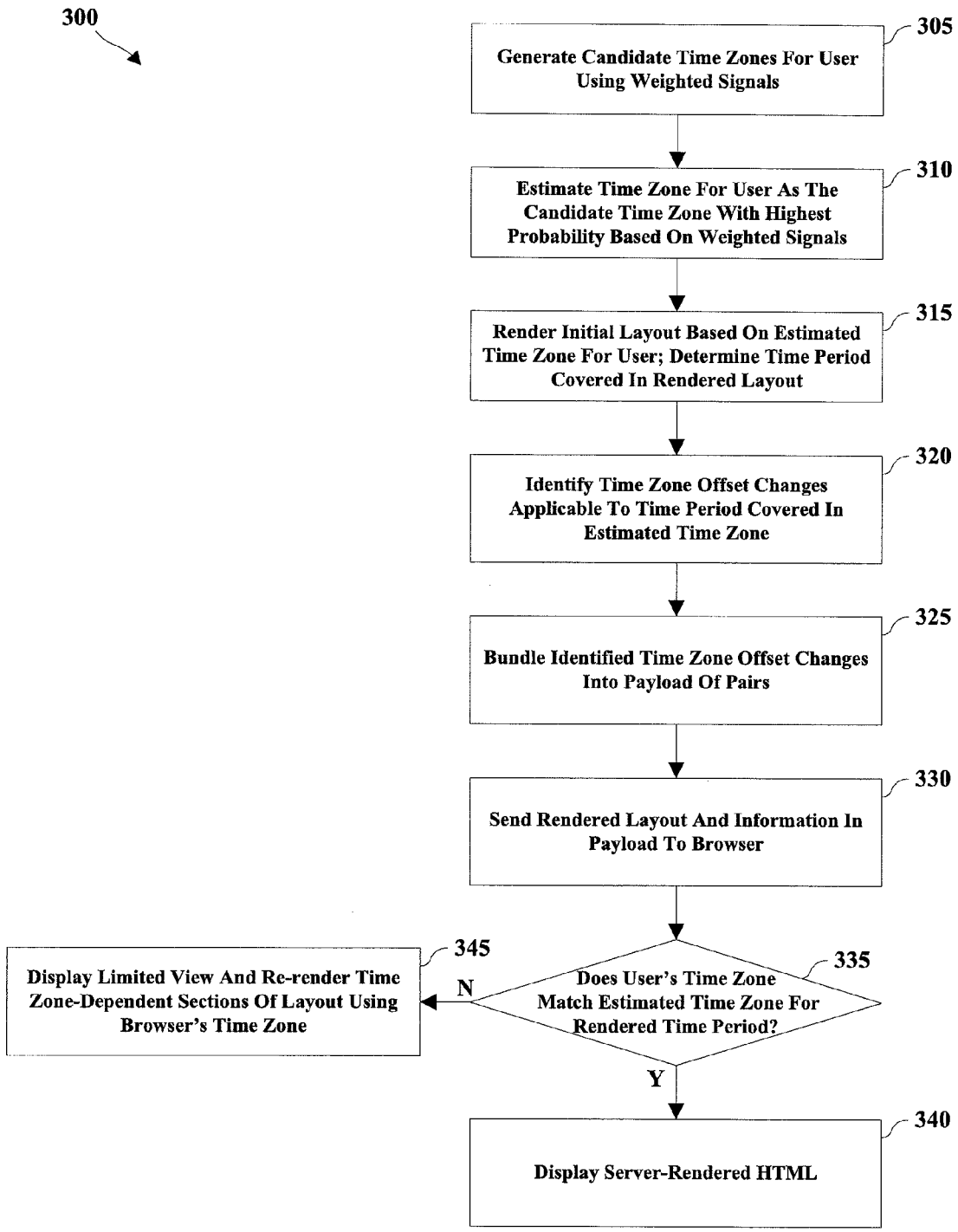
FIG. 3 is a flowchart illustrating an example method for rendering and displaying time-bound information to a user, including data specific to a time zone determined as applicable to the user based on weighted signals according to one or more embodiments described herein.

FIG. 3 illustrates an example process for rendering and displaying time-bound information (e.g., calendar data) to a user, including data specific to a time zone determined to be applicable to the user. In accordance with at least one embodiment, the example process 300 may be performed by a web application (e.g., a calendar application or any web application that displays time-bound information) similar to system 100 described above and illustrated in FIG. 1. It should be understood that in accordance with one or more embodiments of the present disclosure, one or more of the blocks described below and illustrated in FIG. 3 may be optional in the process 300 for rendering and displaying time-bound information to a user.

At block 305, candidate times zones that may be applicable to a user may be generated based on one or more weighted signals. For example, a request for a web application received at a web server from a user (e.g., a request sent via a client browser being operated by a user who visits a website associated with the web application, such as client browser 105 sending an initial HTTP render request (130) to web server 110 in the example system 100 shown in FIG. 1) may include various data (e.g., signals) associated with the user and/or the user's request that may be utilized by the web server to generate a set of candidate time zones that may be applicable to the user at the time of the request. One or more of the signals that may be utilized by the web server may be based on, for example, an IP address of a device associated with the request received from the client browser, one or more cookies containing data about the user's preferences and/or previous visits to the website associated with the web application, accepted languages/locales as hinted by HTTP headers of the render request received from the client browser, and the like.

In accordance with at least one embodiment, weights (e.g., weighting terms or values, such as, for example, 0.1, 0.02, 0.6, etc.) may be assigned to the various signals utilized to generate the candidate time zones at block 305.

For example, a web server (e.g., web server 110 in the example system 100 shown in FIG. 1) may assign weights to the signals identified/determined by the web server based on how useful each signal is as a predictor/indicator of the user's current time zone (e.g., a measure of the utility of each signal in estimating a time zone applicable to the user/client).

At block 310, a time zone for the user may be estimated from the candidate time zones generated at block 305. In accordance with at least one embodiment, the time zone estimated for the user at block 310 may be the candidate time zone from block 305 having the highest probability based on the weighted signals.

At block 315, an initial layout for the requested web application may be rendered based on the time zone estimated at block 310. For example, an initial HTML layout for a calendar application requested by the user may be rendered by a corresponding web server hosting the application. In accordance with at least one embodiment, while the initial layout for the web application is being rendered at block 315, a determination may be made as to the time period covered (e.g., weeks, months, etc.), for example, by time-zone-unaware user data obtained from a database associated with the server and/or various other time-bound data of the user that is being rendered in the initial layout. In one example, time-zone-unaware user data may include various calendar events data such as an event title, even description, list of attendees, etc. In the context of a social post (e.g., a social network post), such time-zone-unaware user data may include, for example, the contents of the post, photo links, comment contents, and the like.

At block 320, time zone offset changes applicable to the time period covered in the estimated time zone for the user may be identified. For example, if the time period covered is determined to be a period of three months, from February 1st to May 1st, then time offset changes that may be identified at block 320 may include "the time offset at the beginning of March is UTC+1," "the time offset at the end of March is UTC+2," and "there is a transition event at 31 March at 02:00."

At block 325, information about the time zone offset changes identified at block 320 may be bundled into one or more payloads, and at block 330 these payloads may be sent with the rendered (HTML) layout from block 315 to the client browser.

At block 335, a determination may be made as to whether the user's actual time zone matches the estimated time zone for the rendered time period. In accordance with at least one embodiment described herein, the determination that may be made at block 335 may be made by the client browser upon receiving the rendered layout and payload information at block 330 (e.g., the determination may be made by client browser 105 upon receiving response (130) from web server 110 in the example system 100 shown in FIG. 1). If it is determined at block 335 that the user's time zone matches the estimated time zone for the rendered time period, the rendered (HTML) layout (e.g., the "server-rendered HTML") sent to the browser at block 330 may be displayed by the browser at block 340. On the other hand, if it is determined at block 335 that the user's time zone does not match the estimated time zone for the rendered time period, then at block 345 a limited (e.g., degraded, reduced, etc.) view of (e.g., the initial page of) the web application may be displayed by the browser while the browser re-renders time zone-dependent portions of the displayed view using the time zone applicable to the browser.

Figure 4:
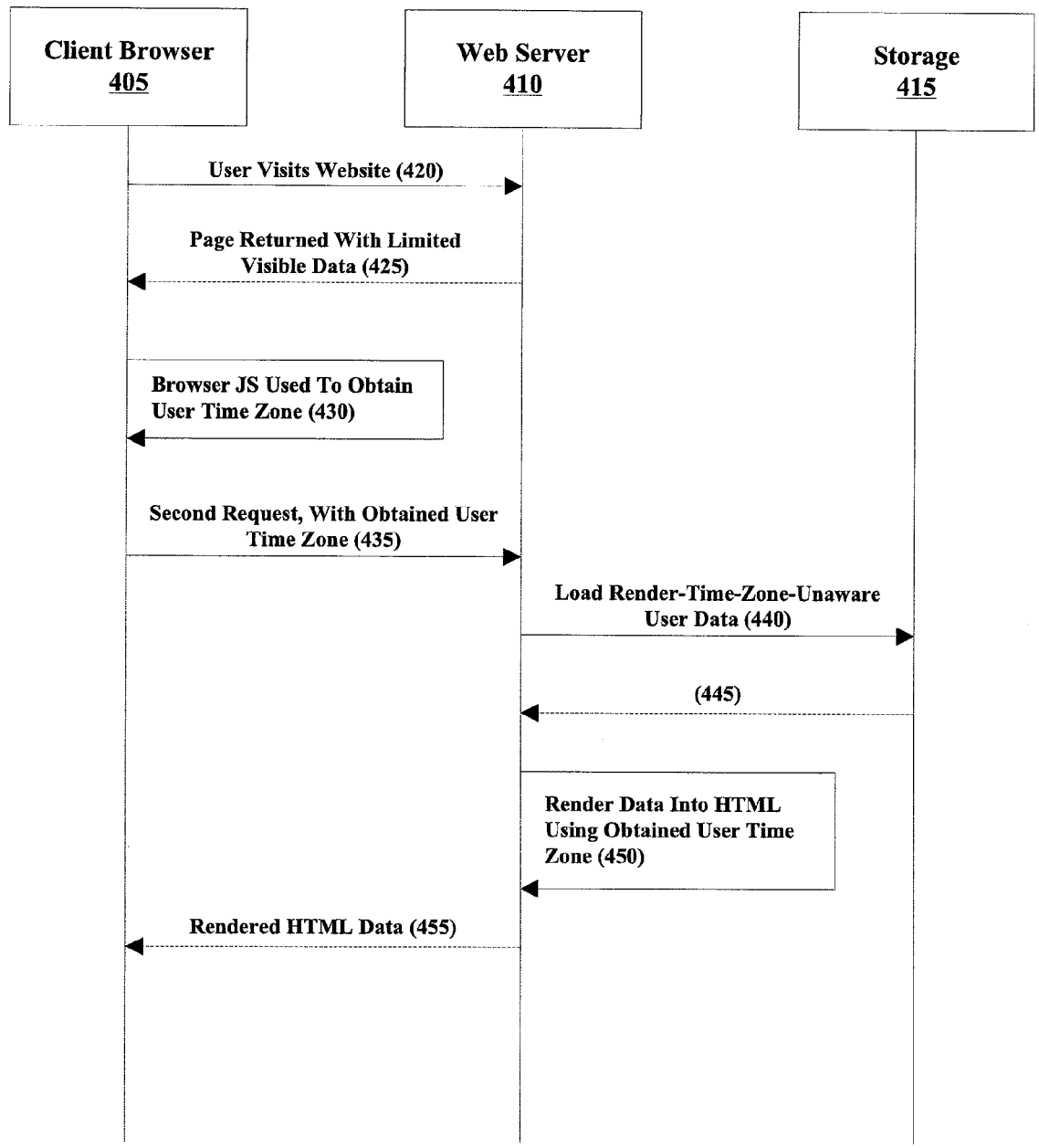
FIG. 4 is a data flow diagram illustrating example data flows between components of a system for rendering and displaying time-bound information to a user, including data specific to a time zone determined as applicable to the user based on information obtained from a web browser of the user according to one or more embodiments described herein.

FIG. 4 illustrates example data flows in a system for rendering and displaying time-bound information (e.g., calendar data) to a user, including data specific to a time zone determined as applicable to the user based on information obtained from a web browser of the user. In accordance with one or more embodiments described herein, the data flows may be between a client browser 405, a web server 410, and storage (e.g., database) 415, and may include data specific to a time zone determined as applicable to a user based on data obtained from the client browser 405. In at least one implementation, the example data flows illustrated in FIG. 4 may be between components of a system similar to system 100 described above and illustrated in FIG. 1.

A user may access a web application, such as calendar application, by directing client browser 405 to a corresponding website (420) for the application hosted by web server 410. For example, when client browser 405 is directed to a website for a calendar application, client browser 405 may send a HTTP request (420) (e.g., initial GET request (120) sent from client browser 105 to web server 110 in the example system 100 shown in FIG. 1) to web server 410. The server 410, upon receiving the render request (420) from the client browser 405, may determine that additional data is needed in order to estimate a time zone applicable to the client and, as result, return to the client a webpage view with no visible data (425). In accordance with at least one embodiment, the server 410 may send to the client browser 405 a webpage without any visible data where, for example, the server 410 is unable to determine (e.g., estimate) a time zone applicable to the user at the time of the request (420).

The client browser 405, upon receiving the webpage without any visible data (425) from the server 410, may use the browser's 405 JavaScript to obtain a time zone applicable to the user (430). The client browser 405 may then send a second request (435) for the webpage to the server 410, where the second request (435) includes the time zone obtained for the user.

The web server 410, having received the second request with the user's time zone (435) from the client browser 405, may send a load request (440) (e.g., may request/retrieve/etc.) for rendered time-zone-unaware user data to storage 415. In accordance with at least one embodiment, time-zone-unaware user data may include various calendar events data such as an event title, even description, list of attendees, etc. In accordance with at least one other embodiment, in the context of a social post (e.g., a social network post), such time-zone-unaware user data may include, for example, the contents of the post, photo links, comment contents, and the like.

In response to the load request (440), the web server 410 may receive the time-zone-unaware user data (445) from storage 415, and render the received time-zone-unaware user data into HTML (450) using the time zone obtained for the user by the client browser 405. The web server 410 may send the rendered HTML (455) to the client browser 405 such that the client browser 405 may display the webpage of the application to the user, where the webpage includes data specific to the time zone of the user.

Figure 5:
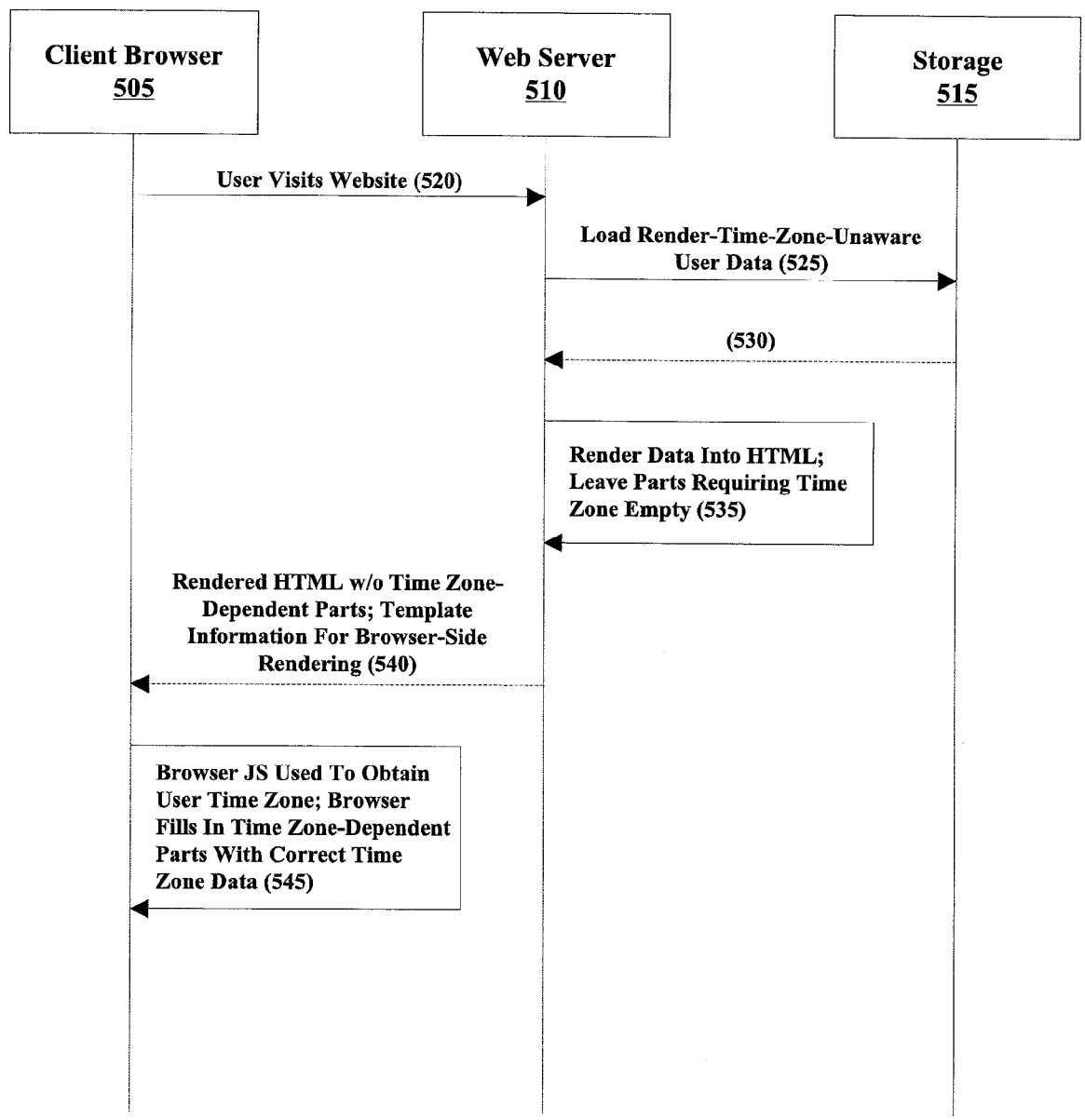
FIG. 5 is a data flow diagram illustrating example data flows between components of a system for rendering and displaying time-bound information to a user while omitting data specific to a time zone applicable for the user according to one or more embodiments described herein.

FIG. 5 example data flows in a system for rendering and displaying time-bound information or data (e.g., calendar data) to a user while omitting data specific to a time zone applicable to the user. In accordance with one or more embodiments described herein, the data flows may be between a client browser 505, a web server 510, and storage (e.g., database) 515, and may include server-rendered data other than time zone-dependent data for a web application requested by a user. In at least one implementation, the example data flows illustrated in FIG. 5 may be between components of a system similar to system 100 described above and illustrated in FIG. 1.

A user who wishes to access a web application, such as calendar application, may do so by directing client browser 505 to a corresponding website (520) for the application hosted by web server 510. In such a scenario, client browser 505 may send a HTTP request (520) (e.g., initial GET request (120) sent from client browser 105 to web server 110 in the example system 100 shown in FIG. 1) to web server 510. The server 510, upon receiving the render request (520) from the client browser 505, may send a load request (525) (e.g., may request/retrieve/etc.) for rendered time-zone-unaware user data to storage 515. In response to the load request (525), the web server 510 may receive the time-zone-unaware user data (530) from storage 515, and render the received time-zone-unaware user data into HTML (535), leaving the parts of the rendered HTML that are time zone-dependent empty.

The web server 510 may send the rendered HTML without the time-zone dependent portions (540) to the client browser 505. In accordance with at least one embodiment, the server 510 may send (540), together with the rendered HTML without the time-zone dependent portions, template information for browser-side rendering of the time-zone-dependent data. For example, a template may be the representation of the information architecture in the web page, with placeholders where entities will appear (e.g., events, event titles, etc.). Depending on the particular application, the template information may be a simple string concatenation that produces renderable output, such as HTML.

The client browser 505, upon receiving rendered HTML without the time-zone dependent parts (540) from the server 510, may use the browser's 505 JavaScript to obtain a time zone applicable to the user (545), and may fill-in the time zone-dependent parts of the rendered HTML with correct time zone data for the user.

FIGS. 6-9 are example graphical user interface screens illustrating various stages of rendering and displaying data for a web application (e.g., calendar application) requested by a user. In accordance with one or more embodiments described herein, the example user interface screens illustrated in FIGS. 6-9 may correspond with one or more of the operations included in the example process described above and illustrated in FIG. 3, and/or one or more of the data flows in the example system for rendering and displaying calendar data to a user as described above and illustrated in FIGS. 1, 2, 4, and 5.

Figure 6:
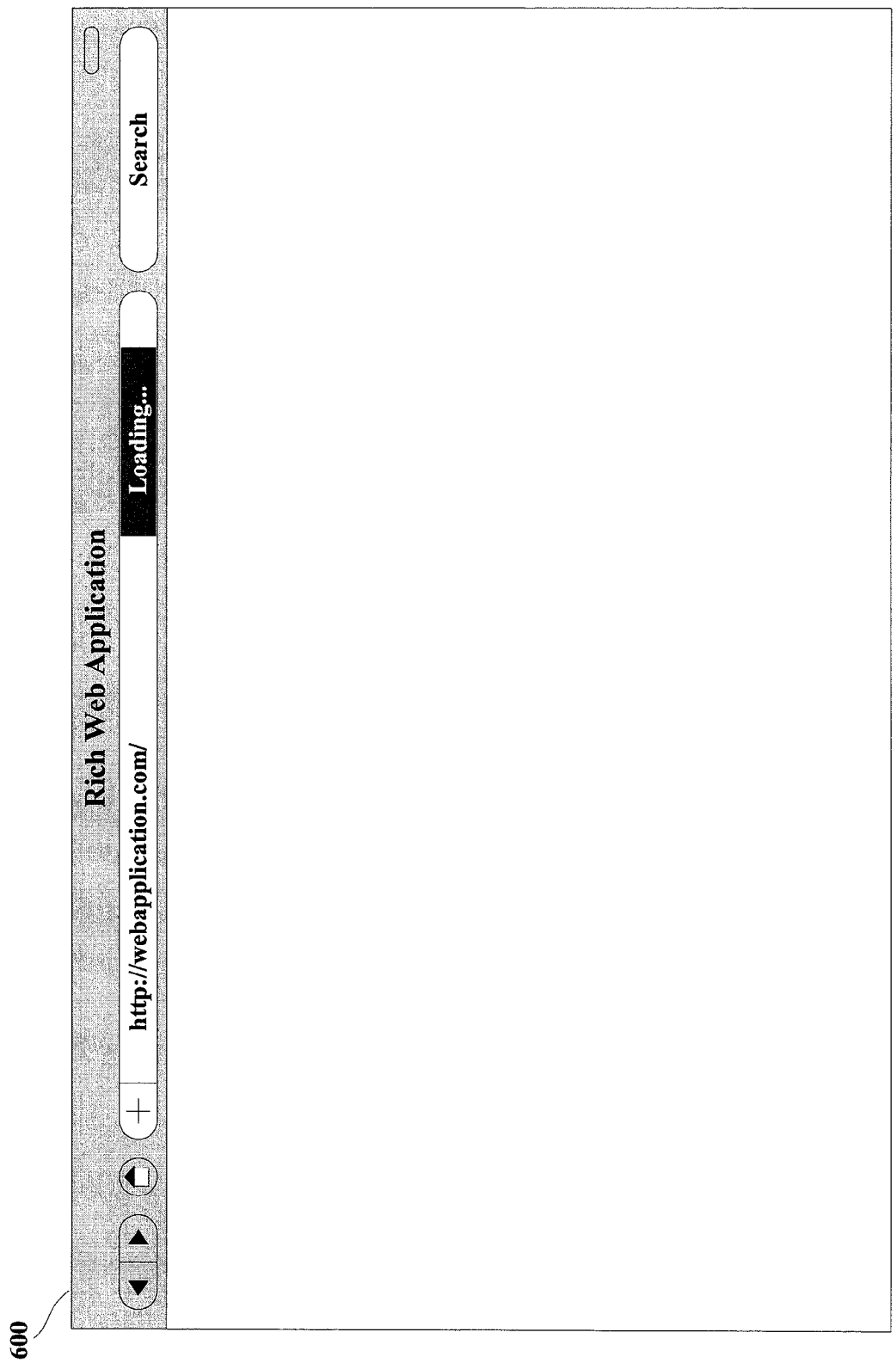
FIG. 6 is a graphical user interface screen illustrating an example of a web application loading in a client browser.

FIG. 6 illustrates an example user interface screen 600 that may be displayed in a client browser for a web application requested by a user as the web application is initializing (e.g., loading) in the browser. For example, user interface screen 600 may be displayed in a client browser for a calendar application requested by a user.

Figure 7:
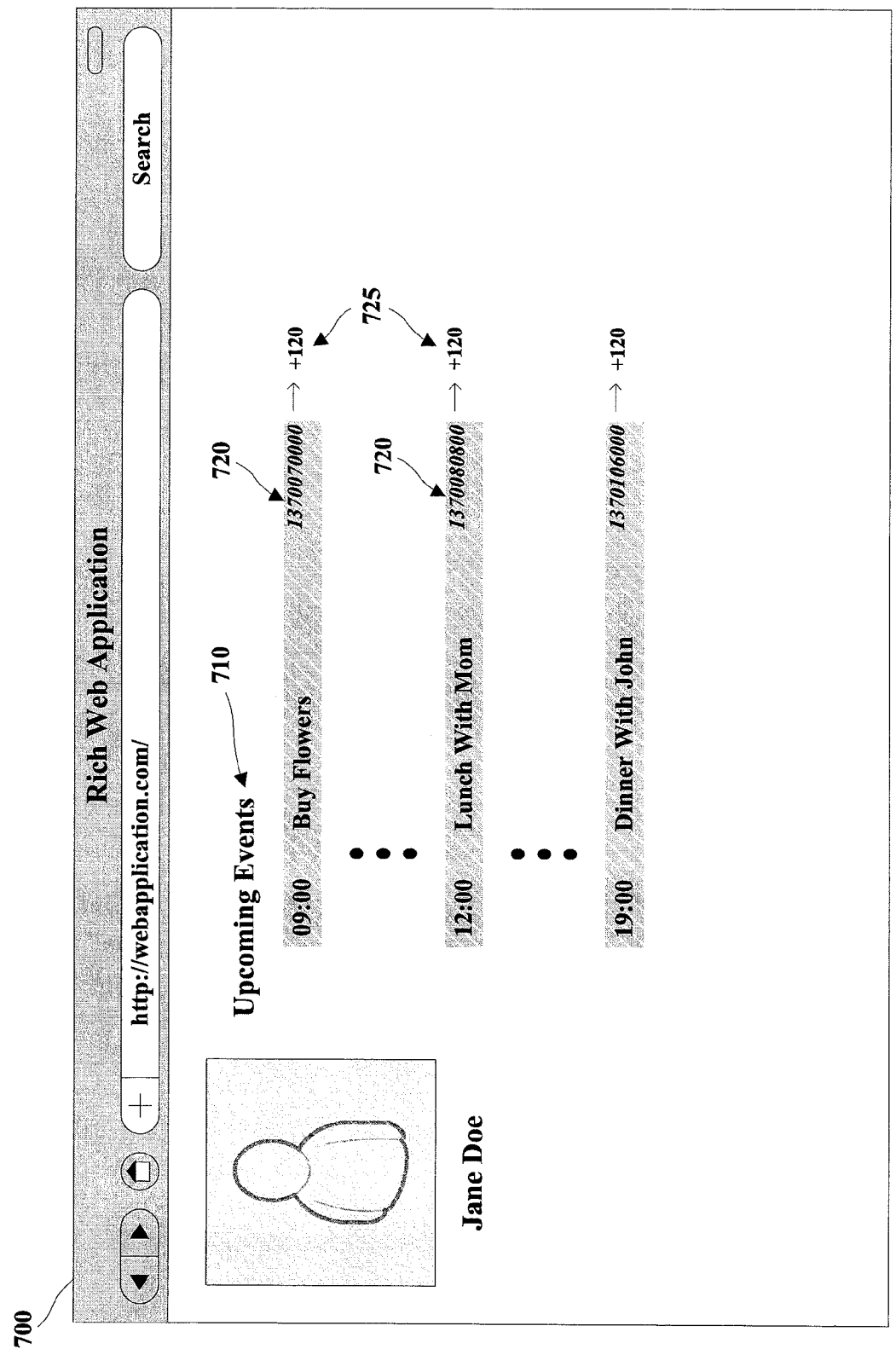
FIG. 7 is a graphical user interface screen illustrating an example of time stamped annotations pertaining to time zone offsets of time-bound information to be displayed to a user in a web application according to one or more embodiments described herein.

FIG. 7 illustrates an example user interface screen 700 that may be created by a client browser for a web application requested by a user as rendered HTML data arrives at the client browser from the web server (e.g., as rendered HTML data (130) arrives at client browser 105 from web server 110 in the example system 100 shown in FIG. 1). In accordance with one or more embodiments described herein, where the requested web application is a calendar application, the HTML that may be received at the client browser from the web server may include time stamped annotations 720 pertaining to time zone offsets 725 for calendar data (e.g., upcoming calendar events 710) to be displayed to the user. It should be noted that example user interface screen 700 is not actually displayed to the user in the client browser, but rather illustrates what may be created by the client browser based on the HTML received from the web server in response to an initial HTTP request sent to the web server.

Figure 8:
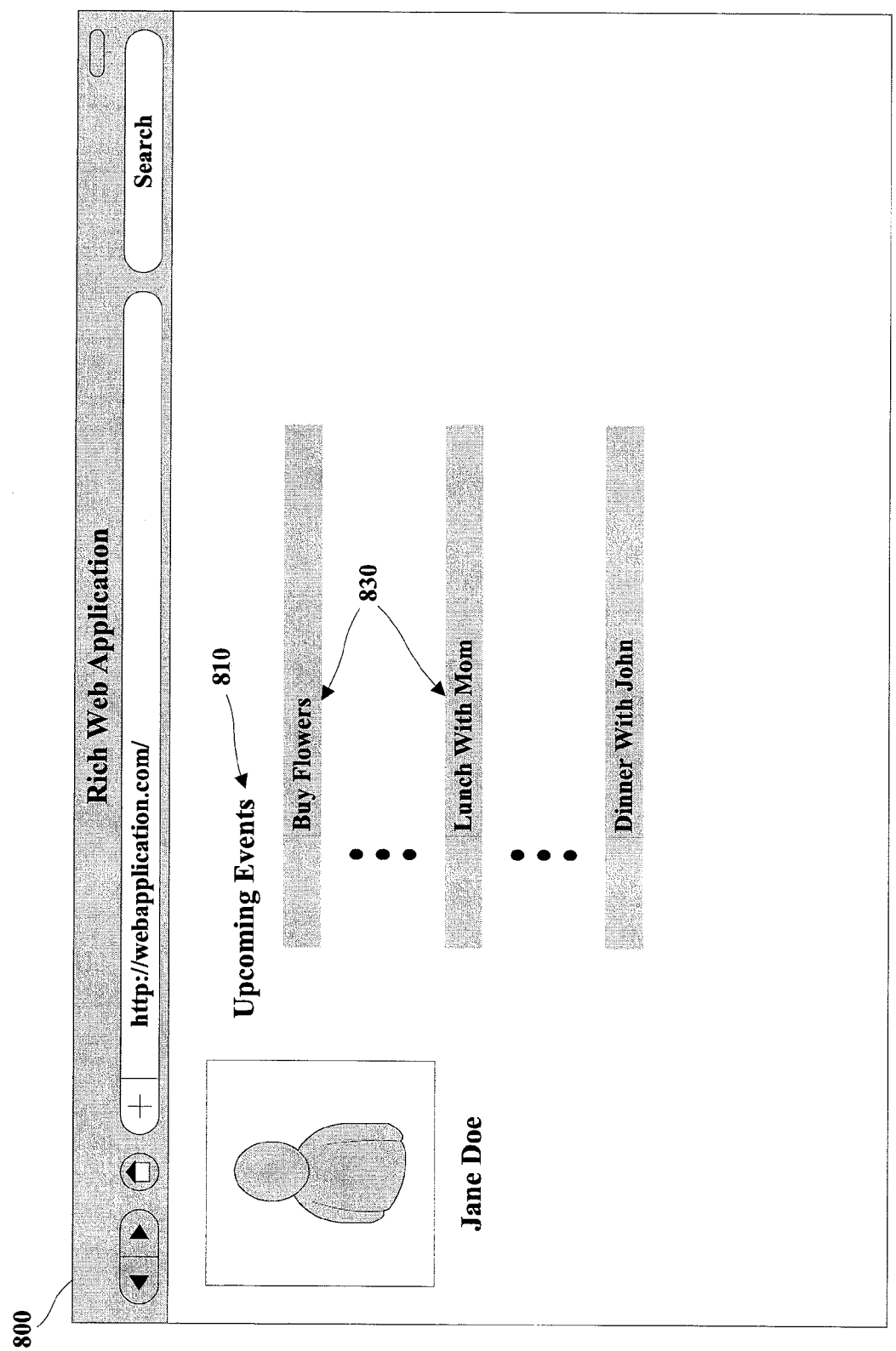
FIG. 8 is a graphical user interface screen illustrating an example of non-time zone specific time-bound information displayed to a user in a web application according to one or more embodiments described herein.

FIG. 8 illustrates an example user interface screen 800 that may be displayed in a client browser for a web application requested by a user in accordance with one or more embodiments described herein. For example, where the requested web application is a calendar application, and time zone offsets for calendar data to be displayed to the user (e.g., time zone offsets 725 for upcoming events 710 as indicated by time stamped annotations 720 in the example user interface 700 shown in FIG. 7) in the web application are determined to be invalid, the client browser may display example user interface screen 800, which includes non-time zone specific calendar data 830. In accordance with at least one embodiment, the non-time zone specific data 830 (e.g., the subjects/titles/names/etc. of upcoming calendar events 810 of the user) may be displayed to the user while the web application's code libraries load. By providing for the display of non-time zone specific data 830 to the user, the methods and systems of the present disclosure allow meaningful calendar data to be displayed to the user without the full web application having to execute in the client browser.

Figure 9:
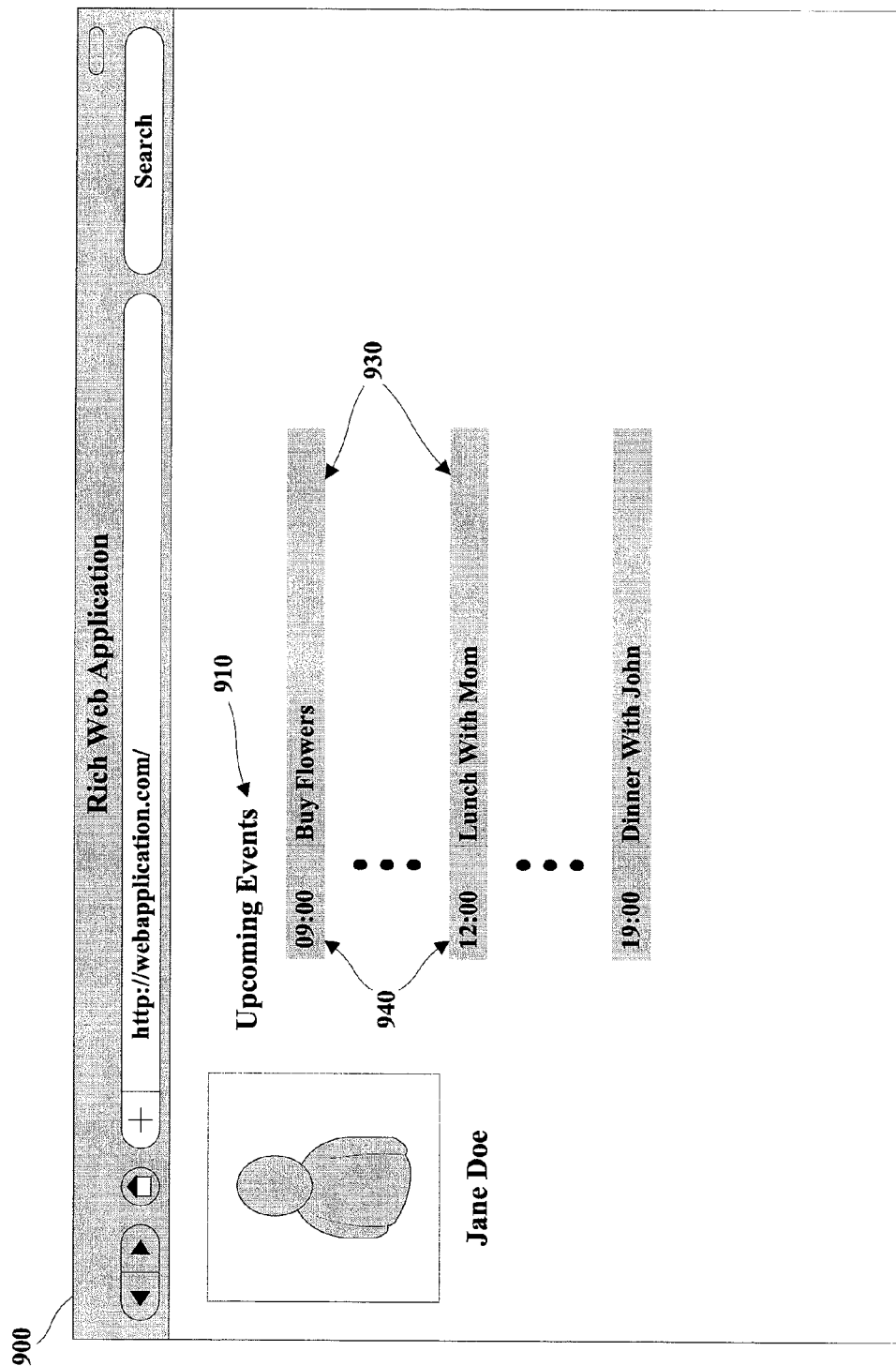
FIG. 9 is a graphical user interface screen illustrating an example of time-bound information displayed to a user in a web application, including data specific to a time zone determined to be applicable to the user according to one or more embodiments described herein.

FIG. 9 illustrates an example user interface screen 900 that may be displayed in a client browser for a web application requested by a user according to one or more embodiments described herein. For example, where the requested web application is a calendar application, and time zone offsets for calendar data to be displayed to the user (e.g., time zone offsets 725 for upcoming events 710 as indicated by time stamped annotations 720 in the example user interface 700 shown in FIG. 7) in the web application are determined to be valid for the user, the client browser may display example user interface screen 900, which includes time-zone specific calendar data 940 (e.g., the times of upcoming calendar events 910) in addition to non-time zone specific data 930.

Figure 10:
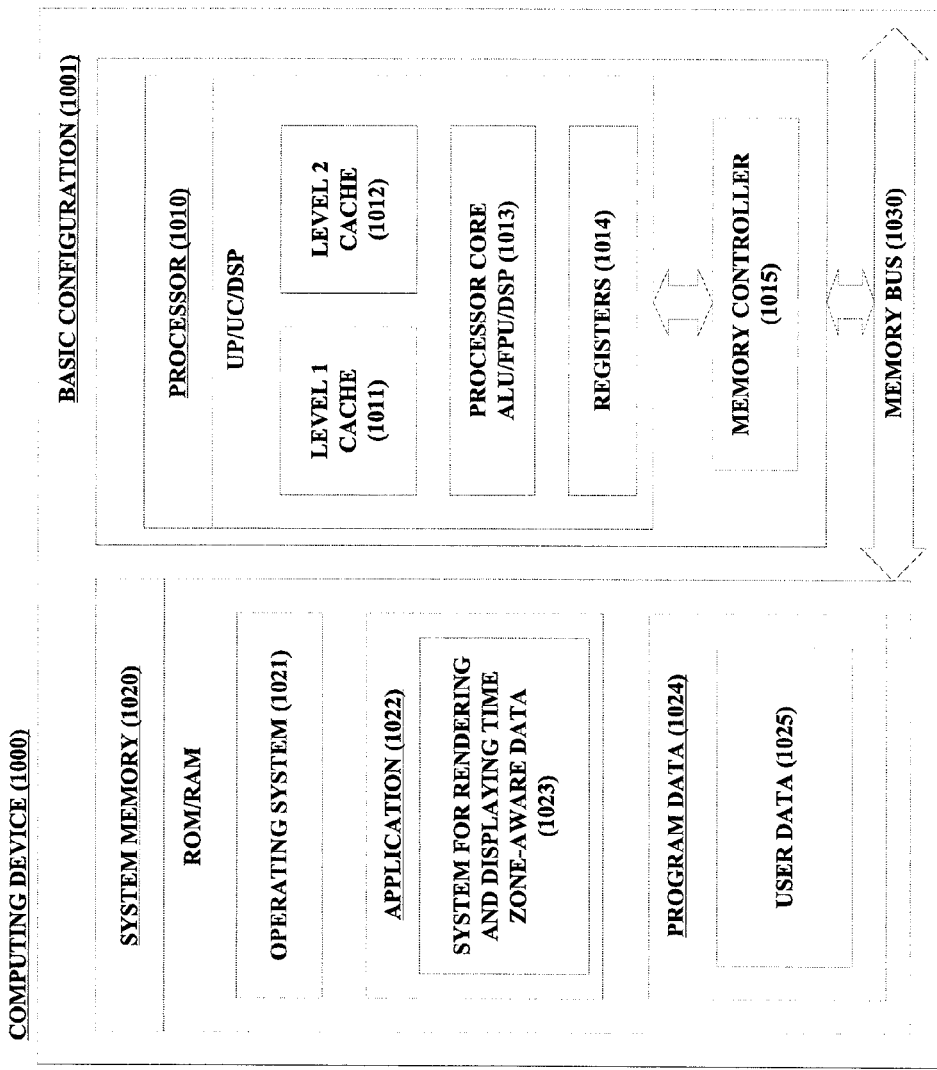
FIG. 10 is a block diagram illustrating an example computing device arranged for rendering and displaying time-bound information to a user in a web application, including data specific to a time zone determined to be applicable to the user according to one or more embodiments described herein.

FIG. 10 is a high-level block diagram of an exemplary computer (1000) that is arranged for rendering and displaying data to a user in a web application (e.g., a calendar application), including data specific to a time zone determined to be applicable to the user. In a very basic configuration (1001), the computing device (1000) typically includes one or more processors (1010) and system memory (1020). A memory bus (1030) can be used for communicating between the processor (1010) and the system memory (1020).

Depending on the desired configuration, the processor (1010) can be of any type including but not limited to a microprocessor (μP), a microcontroller (μC), a digital signal processor (DSP), or any combination thereof. The processor (1010) can include one more levels of caching, such as a level one cache (1011) and a level two cache (1012), a processor core (1013), and registers (1014). The processor core (1013) can include an arithmetic logic unit (ALU), a floating point unit (FPU), a digital signal processing core (DSP Core), or any combination thereof. A memory controller (1016) can also be used with the processor (1010), or in some implementations the memory controller (1015) can be an internal part of the processor (1010).

Depending on the desired configuration, the system memory (1020) can be of any type including but not limited to volatile memory (such as RAM), non-volatile memory (such as ROM, flash memory, etc.) or any combination thereof. System memory (1020) typically includes an operating system (1021), one or more applications (1022), and program data (1024). The application (1022) may include a system (e.g., system 100 as shown in the example of FIG. 1) for rendering and displaying time-zone aware data (1023). In accordance with at least one embodiment, the system for rendering and displaying time-zone aware data (1023) may be configured to provide server-side rendering of an initial layout for a web application (e.g., a calendar application) without compromising the correctness of the initial layout if the server-side heuristics fail.

Program data (1024) may include storing instructions that, when executed by the one or more processing devices, implement a system and method for rendering and displaying time-zone aware data in a web application. For example, in accordance with at least one embodiment, the system and method that may be implemented by executing program data (1024) on one or more processing devices may provide for rendering and displaying meaningful calendar data to a user in a calendar application without the full application having to execute in the client browser (e.g., displaying non-time zone specific data 830 for various calendar data 810 in example user interface screen 800 as shown in FIG. 8). Additionally, in accordance with at least one embodiment, program data (1024) may include user data (1025), which may relate to specific data associated with the user including, for example, an IP address, one or more cookies containing data about the user's preferences and/or previous visits to a website associated with the requested web application, accepted languages/locales as indicated by HTTP headers of the render request received at the web server hosting the application, and the like. In some embodiments, the application (1022) can be arranged to operate with program data (1024) on an operating system (1021).

The computing device (1000) can have additional features or functionality, and additional interfaces to facilitate communications between the basic configuration (1001) and any required devices and interfaces.

System memory (1020) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of the device (1000).

The computing device (1000) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (1000) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In situations in which the systems discussed herein may collect personal information about users, or may make use of personal information about users, the users may be provided with an opportunity to control whether programs or features of such systems collect user information (e.g., information about a user's preferences, a user's browsing history, a user's current location, etc.).

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving, at a server, a request for a web application from a client, wherein the web application displays time-bound information;
estimating, at the server, a time zone applicable to the client based on weighted data associated with a user of the client;
rendering, at the server, initial layout data in HTML for the web application including the time-bound information based on the estimated time zone; and
sending the rendered layout data to the client, wherein the client determines whether or not the estimated time zone matches an actual time zone applicable to the client and based on determining that the estimated time zone matches an actual time zone applicable to the client uses the rendered layout data to display an initial view of the web application to the user, wherein the initial view of the web application includes time zone-dependent data specific to the user.

2. The method of claim 1, further comprising:
determining a time period covered by time-bound information of the user included in the rendered layout;
identifying time zone offset changes applicable to the time period covered by the time-bound information in the estimated time zone; and
sending information about the identified time zone offsets with the rendered layout data to the client.

3. The method of claim 1, further comprising:
responsive to receiving the request for the web application, determining that additional data is needed to estimate a time zone applicable to the client; and
sending to the client rendered layout data containing a limited view of the web application.

4. The method of claim 3, wherein the limited view of the web application includes data other than time zone-dependent data specific to the user.

5. The method of claim 3, further comprising:
receiving at the server an additional request for the web application from the client, wherein the additional request includes an indication of a time zone applicable to the user;
rendering layout data for the web application based on the indicated time zone applicable to the user; and
sending the rendered layout data to the client.

6. The method of claim 5, wherein the indication of a time zone applicable to the user is based on scripts executed at the client.

7. The method of claim 1, further comprising:
receiving, at the server, with the request for the web application, data associated with the user; and
assigning weights to the received data associated with the user based on a measure of utility of the data in estimating a time zone applicable to the client.

8. The method of claim 1, wherein estimating the time zone applicable to the client includes:
generating candidate time zones applicable to the client based on the weighted data associated with the user; and
selecting a candidate time zone with the highest probability based on the weighted data as the estimated time zone applicable to the client.

9. The method of claim 1, wherein the data associated with the user includes an IP address of a device associated with the request for the web application received from the client.

10. The method of claim 1, wherein the data associated with the user includes at least one of the following: an IP address of a device associated with the request for the web application received from the client, one or more cookies containing data indicating a time zone preference for the user, one or more cookies containing data about previous requests for the web application received from the user, and data about language and/or locale preferences of the user indicated by HTTP headers of the request received from the client.

11. The method of claim 1, wherein the web application is a calendar application.

12. A system comprising:
one or more processors; and
a non-transitory computer-readable medium coupled to said one or more processors having instructions stored thereon that, when executed by said one or more processors, cause said one or more processors to perform operations comprising:
receiving, at a server, a request for a web application from a client, wherein the web application displays time-bound information;
estimating, at the server, a time zone applicable to the client based on weighted data associated with a user of the client;
rendering, at the server, initial layout data in HTML for the web application including the time-bound information based on the estimated time zone; and
sending the rendered layout data to the client, wherein the client determines whether or not the estimated time zone matches an actual time zone applicable to the client and based on determining that the estimated time zone matches an actual time zone applicable to the client uses the rendered layout data to display an initial view of the web application to the user, wherein the initial view of the web application includes time zone-dependent data specific to the user.

13. The system of claim 12, wherein the one or more processors are caused to perform further operations comprising:
determining a time period covered by time-bound information of the user included in the rendered layout;
identifying time zone offset changes applicable to the time period covered by the time-bound information in the estimated time zone; and
sending information about the identified time zone offsets with the rendered layout data to the client.

14. The system of claim 12, wherein the one or more processors are caused to perform further operations comprising:
responsive to receiving the request for the web application, determining that additional data is needed to estimate a time zone applicable to the client; and
sending to the client rendered layout data containing a limited view of the web application, wherein the limited view of the web application includes data other than time zone-dependent data specific to the user.

15. The system of claim 14, wherein the one or more processors are caused to perform further operations comprising:
receiving an additional request for the web application from the client, wherein the additional request includes an indication of a time zone applicable to the user;
rendering layout data for the web application based on the indicated time zone applicable to the user; and
sending the rendered layout data to the client.

16. The system of claim 12, wherein the one or more processors are caused to perform further operations comprising:
receiving, with the request for the web application, data associated with the user; and
assigning weights to the received data associated with the user based on a measure of utility of the data in estimating a time zone applicable to the client.

17. The system of claim 12, wherein the one or more processors are caused to perform further operations comprising:
generating candidate time zones applicable to the client based on the weighted data associated with the user; and
selecting a candidate time zone with the highest probability based on the weighted data as the estimated time zone applicable to the client.

18. The system of claim 12, wherein the data associated with the user includes at least one of the following: an IP address of a device associated with the request for the web application received from the client, one or more cookies containing data indicating a time zone preference for the user, one or more cookies containing data about previous requests for the web application received from the user, and data about language and/or locale preferences of the user indicated by HTTP headers of the request received from the client.

19. The system of claim 12, wherein the web application is a calendar application.

20. One or more non-transitory computer readable media storing computer-executable instructions that, when executed by one or more processors, causes the one or more processors to perform operations comprising:
 receiving, at a server, a request for a web application from a client, wherein the web application displays time-bound information;
 estimating, at the server, a time zone applicable to the client based on weighted data associated with a user of the client;
 rendering, as the server, initial layout data in HTML for the web application including the time-bound information based on the estimated time zone;
 sending the rendered layout data to the client, wherein the client determines whether or not the estimated time zone matches an actual time zone applicable to the client and based on determining that the estimated time zone matches an actual time zone applicable to the client uses the rendered layout data to display an initial view of the web application to the user, wherein the initial view of the web application includes time zone-dependent data specific to the user.

* * * * *